(12) United States Patent
Batejat et al.

(10) Patent No.: US 7,977,902 B2
(45) Date of Patent: Jul. 12, 2011

(54) METHOD AND APPARATUS FOR PINCH PROTECTION FOR A MOTOR-DRIVEN CLOSURE SYSTEM

(75) Inventors: Fabian Batejat, Strasbourg (FR); Holger Pruessel, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 367 days.

(21) Appl. No.: 12/095,052

(22) PCT Filed: Oct. 12, 2006

(86) PCT No.: PCT/EP2006/067326
§ 371 (c)(1),
(2), (4) Date: May 27, 2008

(87) PCT Pub. No.: WO2007/071471
PCT Pub. Date: Jun. 28, 2007

(65) Prior Publication Data
US 2009/0237024 A1    Sep. 24, 2009

(30) Foreign Application Priority Data

Dec. 16, 2005   (DE) .......................... 10 2005 060 325

(51) Int. Cl.
*H02H 7/085* (2006.01)
(52) U.S. Cl. ........ 318/466; 318/468; 318/280; 318/283; 318/286; 318/461
(58) Field of Classification Search .................. 318/466, 318/468, 280, 283, 286, 461, 469
See application file for complete search history.

(56) References Cited

U.S. PATENT DOCUMENTS

| | | | | |
|---|---|---|---|---|
| 6,366,042 | B1 * | 4/2002 | Gerbetz | 318/286 |
| 6,408,238 | B1 * | 6/2002 | Lamm et al. | 701/49 |
| 6,867,563 | B2 | 3/2005 | Ohshima | |
| 6,936,984 | B2 * | 8/2005 | Wilson | 318/280 |
| 7,127,848 | B2 | 10/2006 | Okada et al. | |
| 7,170,244 | B2 * | 1/2007 | Choby | 318/280 |
| 7,307,393 | B2 * | 12/2007 | Bizard | 318/285 |
| 7,309,971 | B2 * | 12/2007 | Honma et al. | 318/466 |
| 2003/0137265 | A1 | 7/2003 | De Frutos | |

FOREIGN PATENT DOCUMENTS

| | | |
|---|---|---|
| DE | 10 2005 006 093 | 11/2005 |
| JP | 2001-220948 | 8/2001 |
| JP | 2002-295129 | 10/2002 |
| JP | 2003-35066 | 2/2003 |
| WO | 02/082613 | 10/2002 |

* cited by examiner

*Primary Examiner* — Walter Benson
*Assistant Examiner* — David S Luo
(74) *Attorney, Agent, or Firm* — Michael J. Striker

(57) ABSTRACT

The invention relates to a pinch protection method and device for a motor-driven closing system. The method comprises the following steps: detecting a reduced motor speed, switching off the motor, analyzing a sensor signal for detecting a pinch situation, deciding whether a pinch situation is present, and controlling the motor depending on the detection of a pinch situation. The device for detecting a pinch situation comprises a motor, a detection unit, a control unit and at least one sensor. The device is adapted to carry out the method according to the invention.

11 Claims, 2 Drawing Sheets

METHOD AND APPARATUS FOR PINCH PROTECTION FOR A MOTOR-DRIVEN CLOSURE SYSTEM

PRIOR ART

The present invention relates to a method and an apparatus for pinch protection for a motor-driven closure system.

Motor-driven closure systems with electric drive mechanisms are used in motor vehicles particularly for power window and sliding roof systems. Motors and closure systems are used for motor-driven tailgate closure systems as well. To avoid endangering people and damaging objects, such systems must have pinch protection. This requires that a pinching situation be reliably recognized.

For recognizing a pinching situation, the driving motor is controlled for instance via switch elements, which in turn are affected by a motor monitoring stage. To that end, a reset signal is derived from a certain static motor current value, for instance, and a further reset signal is derived from an at least intermittent chronological change in the motor current. In this arrangement, both static and dynamic motor current monitoring are performed. As a result, the motor is shut off, or its direction of rotation is reversed, if there is a rapid change in torque or a rapid increase when the window meets an obstacle. This also happens if the instantaneous current value is comparatively low. However, the motor is also shut off whenever a further rapid current increase is no longer possible, in the event of a gradual current increase to a value near the short-circuit current. That is, the static motor current and the chronological change in the current are evaluated for recognizing the pinching situation.

It is also generally known to perform rpm monitoring of the motor, in order to assure force limitation and pinch protection in adjusting drive mechanisms in the motor vehicle. The rpm monitoring is done for instance by means of Hall sensors, in order to detect gradual or abrupt changes and to derive the required motor control signals.

In the prior art, a pinching situation is also recognized from the voltage induced in the motor armature; the induced voltage is ascertained from the voltage applied to the motor terminals and from the current flowing in the motor armature.

ADVANTAGES OF THE INVENTION

The method according to the invention for pinch protection for a motor-driven closure system having the characteristics of claim 1 has the advantage that for recognizing a pinching situation, it is embodied in two stages and thus prevents pinching in the closure system especially quickly, reliably, and safely. In a first step, a reduced motor speed is immediately recognized. The motor is thereupon switched off, so that the motor speed decreases still further during the shutoff operation. Now, a sensor signal is analyzed for recognizing a pinching situation. A decision is made as to whether a pinching situation exists. In a further step, the motor is controlled as a function of the recognition of a pinching situation. An advantageous aspect of this method is that even if an only slight deviation in the motor speed is recognized, the motor is immediately switched off. Thus the motor is decelerated. At the same time, the torque or force that the motor can transmit decreases. In the next step, during the shutoff operation of the motor, a sensor signal is evaluated in order to recognize a pinching situation reliably. This method has the major advantage of being especially safe, since the motor is shut off immediately. Hence the protection of people is assured in a reliable way.

The dependent claims disclose preferred refinements of the invention.

An embodiment of the method in which the pinching situation is recognized within a predetermined time period tdec proves to be especially advantageous. Within this time period, the analysis of the sensor signal is done and the decision about the presence or absence of a pinching situation is made. The motor control is done at the end of the time period tdec.

Advantageously, the predetermined time period tdec is shorter than a time period tstop within which the motor comes to a standstill. Thus while the decision whether a pinching situation exists is being made, the motor is still in motion; that is, the motor has not yet been decelerated to a speed of zero. Preferably, the time period tstop is between approximately 5 and 20 milliseconds, depending on requirements and national standards. In addition, the motor noise, as a time-limiting member, can have an influence on the time period. The time period tdec is accordingly shorter and amounts to approximately one-fourth of the time period tstop; in other words, it is between approximately 1.25 and 5 milliseconds.

In a preferred variant of the method of the invention, the rpm of the motor is picked up and evaluated for recognizing a pinching situation. Thus on the one hand the motor speed can be ascertained; on the other, the rpm is available as a sensor signal that is evaluated for recognizing the pinching situation. The motor rpm can be picked up either via Hall sensors or by measuring the motor current. In the process, the ripples at the collector of the motor are evaluated. In the first step of the method of the invention, as soon as a first ripple occurs, the reduced motor speed is recognized and the motor is shut off. For recognizing a pinching situation, the current signal of the motor or the ripples that occur are analyzed further, so that after approximately three to eight ripples, a reliable assessment of the pinching situation can be made.

Advantageously, the sensor signal of a monitoring sensor is evaluated for recognizing a pinching situation. The sensor can have as its sole function the monitoring and recognition of a pinching situation. Such sensors can be located on the motor that drives the closure system, for instance. In that case, the speed, current, force, torque, or the voltage of the driving motor is detected up via sensors. Alternatively, a sensor may also be located for instance on the window or sliding roof to be closed, and the motion of the window or sliding roof can be picked up. To that end, infrared sensors or optical sensors could be used. Ultrasonic sensors, capacitive sensors, or contact strips are also suitable as a basis for recognizing a pinching situation.

Advantageously, according to the method, the direction of rotation of the motor is reversed and the motor speed is increased if a pinching situation is recognized. In that case, the shutoff operation of the motor is accelerated so that the motor speed is reduced to zero, and then the motor is controlled to the operating speed or maximum speed in the opposite direction of rotation. As a result, upon recognition of a pinching situation, the windowpane or sliding roof is re-opened, thus reducing the risk of injury to a person who is caught or of damaging a caught object.

Preferably by the method of the invention, the motor is switched on again and operated with the same direction of rotation if it is recognized that no pinching situation is occurring. Thus if no object is caught in the closure system, the motor is accelerated again, so that the operation of closing the sliding roof or window is continued. A reduction in the motor speed of the driving motor of the closure system can occur for instance whenever the vehicle is traveling over a rough road, causing shocks that are transmitted to the vehicle body and hence to the closure system. In that case, the reduction in the motor speed is reduced to the individual shock, however, so that by evaluating the sensor signal, it is possible to recognize that a pinching situation is not occurring. Since the motor at the moment of the decision about the pinching situation is still moving in the closing direction, the closure operation is continued practically without delay. The reduction in the motor speed is so slight that it is not noticed by the driver or the passengers. Hence despite the rough road, the operation of closing a power window or sliding roof conveniently continues. This accordingly reliably avoids a situation in which the window moves constantly up and down again merely because shocks from the road are being transmitted to the vehicle body.

It is especially advantageous that when a pinching situation is not occurring, the analyzed sensor signal is filtered out. As a result, on rough roads when multiple shocks impact the vehicle body, these interference signals can be eliminated, so that these signals no longer need to be taken into account in assessing the pinching situation. As a result, the recognition of a pinching situation becomes more reliable and faster. The safety for the passengers and for caught objects is preserved. Preferably by the method, in recognizing the pinching situation, the characteristic curve of the motor is taken into account during the shutoff. In the normal situation, for recognizing a pinching situation, the assumption is a relatively constant motor speed. However, by the method of the invention, the motor is decelerated during the analysis of the sensor signals for recognizing the pinching situation. The result is an altered characteristic curve for the motor speed. This characteristic curve for the motor is a curve that drops from the working or maximum speed of the motor to the standstill of the motor. It must be taken into account in assessing the sensor signals, especially if the motor current, or the voltage induced in the motor, is assumed as a basis. Hence the reliability on recognizing the pinching situation is improved. The safety of the closure system for persons, especially vehicle passengers, is enhanced markedly as a result.

The method according to the invention for recognizing pinching situations is performed by an apparatus which includes a motor, a recognition unit, a control unit, and at least one sensor. The sensor monitors the motor that drives the apparatus. The sensor signal is evaluated by a recognition unit. The change in the motor speed and a pinching situation are both recognized by analysis of the sensor signal. After a pinching situation is recognized or a reduced motor speed is ascertained, the control unit causes the motor to be decelerated, or the direction of rotation of the motor to be reversed and the motor speed to be increased, or the motor to continue operating in the same direction of rotation. Since the motor is immediately decelerated, or in other words even before a pinching situation is finally recognized, the torque or force exerted by the motor is reduced. In this way, stringent standardized demands can be met with simple and inexpensive electronic components.

Especially preferably, the motor of the apparatus for recognizing pinching situations is intended as a drive mechanism for a power window, sliding roof or tailgate system in motor vehicles.

DRAWINGS

The invention is described in detail below in terms of preferred exemplary embodiments. In the drawings.

DESCRIPTION OF THE EXEMPLARY EMBODIMENTS

Figure 1:
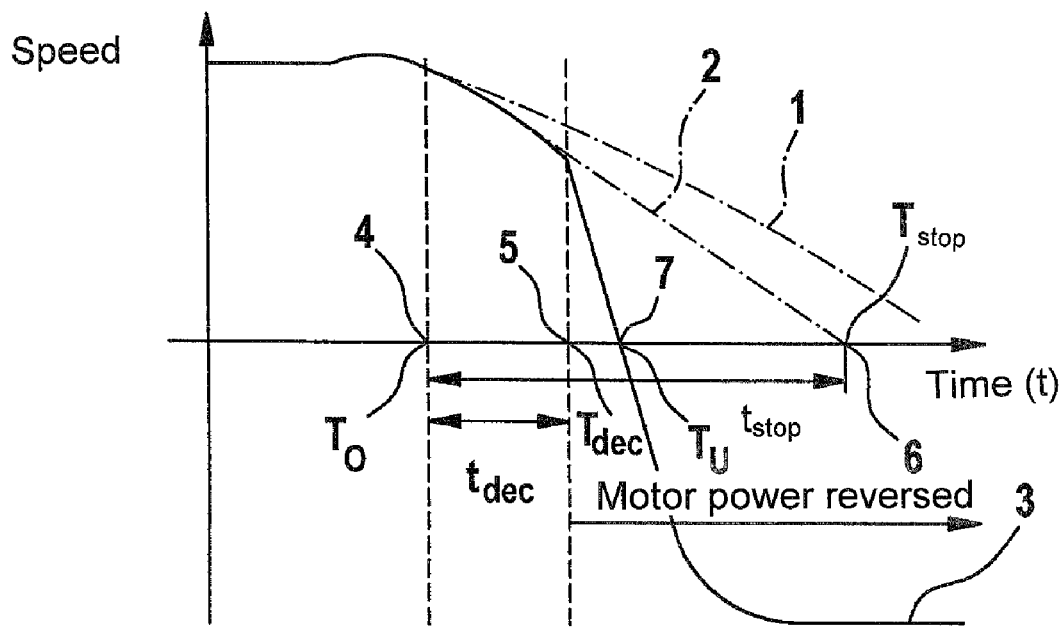
FIG. 1 is a graph showing the motor speed upon employment of the method of the invention when a pinching situation is recognized.

Below, the course of the speed of the motor of a power window over time will be explained with reference to FIG. 1. FIG. 1 shows the motor speed or the rpm in various situations, when a vehicle is located or is moving on a smooth road, or in other words when no shocks or the like are affecting the motor.

Curve 1 shown in dashed lines in FIG. 1 represents the drop over time in the motor speed from the working or maximum speed, if at a time T0, identified by reference numeral 4, the motor in normal operation is switched off. In that case, a power window is for instance moved to its terminal position or is stopped by the vehicle passenger.

Curve 2 represents the course of the motor speed if at time T0 a reduction in the motor speed is recognized because an object is caught in the power window. The motor is shut off after that. If this shutoff operation were continued without analyzing the sensor signals to ascertain whether a pinching situation is occurring, then the motor speed would be reduced to zero at a time Tstop, marked by reference numeral 6. At that time, the standstill of the motor would ensue. Curve 2 has a greater slope than curve 1, since the motor in the "pinch protection" mode of operation is decelerated harder as a result of the caught object between the window and the window frame than in normal operation.

Curve 3 in FIG. 1 shows the course of the motor speed if a pinching situation is recognized and the motor is controlled in accordance with the method of the invention. At time T0, marked by reference numeral 4, a reduced motor speed is recognized and the motor is switched off. The speed of the motor then follows curve 2. Within a time period at tdec beginning at time T0, reference numeral 4, a decision is then made whether a pinching situation exists. At time Tdec, reference numeral 5, in the presence of a pinching situation, the direction of rotation of the motor is reversed and the motor speed is increased again to the maximum speed. Thus the motor speed follows curve 3. It should be noted here that the reversal of the motor is attained after only a very short time, at time Tu, reference numeral 7.

Figure 2:
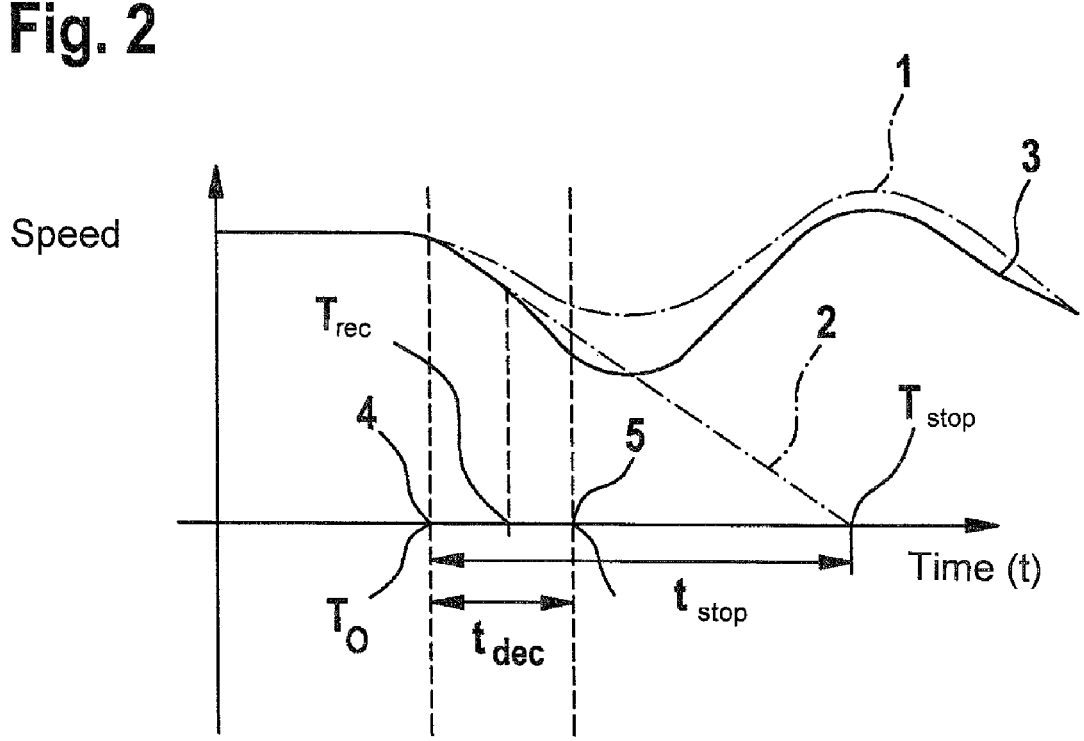
FIG. 2 is a graph of the motor speed in the event that a pinching situation is not occurring.

FIG. 2 likewise shows the course over time of the motor speed, but for the case where shocks are transmitted to the motor from outside. This is the case if the vehicle is moving over a rough road or for instance strikes a curb.

Here, curve 1 shows the case where the vehicle for instance strikes a curb at time T0 (reference numeral 4). The shocks acting on the vehicle are transmitted to the motor. The speed or rpm of the motor is varied as a result, so that the speed of the motor follows curve 1. No pinching situation is occurring.

In FIG. 2, the case is shown where at time T0, reference numeral 4, a reduction in the motor speed is recognized. The motor is thereupon switched off. The motor speed follows curve 2. Within the period between T0 and Tdec, reference numeral 5, it is recognized that no pinching situation is occurring. In this case, the motor speed is increased again immediately after the decision that no pinching situation is occurring. From the instant of recognition Trec, the motor speed follows curve 3 and no longer follows curve 2. Curve 3 then takes on the basic course of curve 1, since the shocks that are occurring are transmitted to the motor in this situation as well.

Figure 3:
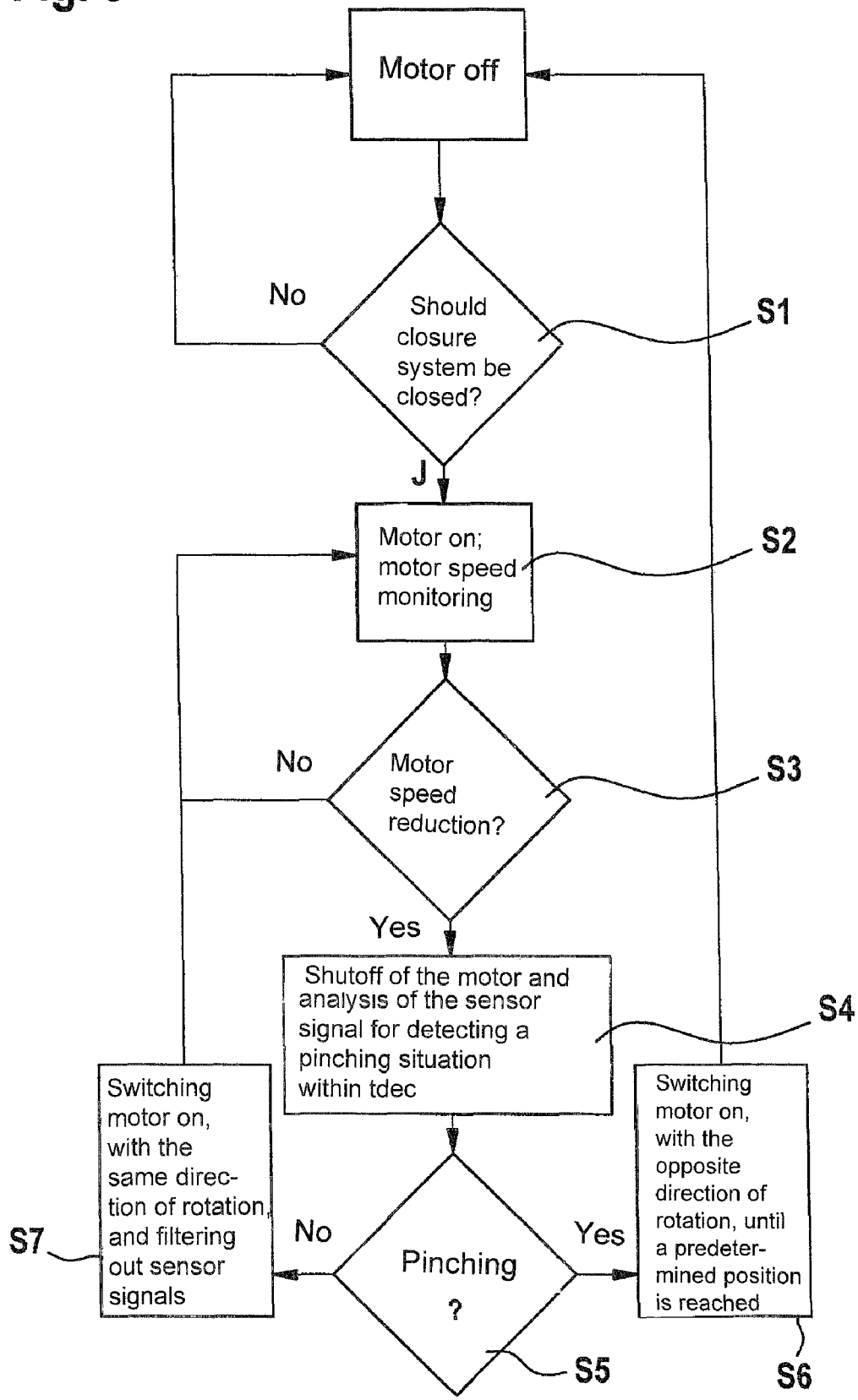
FIG. 3 is a flow chart for illustrating the method of the invention.

FIG. 3 shows a flow chart which describes the motor controlled by the method of the invention.

Beginning with the switched-off motor, the question is asked in a step S1 whether a closure system, such as a power window, is to be closed. If no such signal is present, the motor remains off.

If there is a request for closing the closure system, then in step S2 the motor is operated and at the same time the motor speed is monitored. Simultaneously, the motor is switched on and begins to rotate. At step S3, it is ascertained whether a reduction in the motor speed exists, and especially whether an abnormal reduction is recognized.

If no reduction in the motor speed is recognized, then a return is made to step S2, and the motor speed continues to be monitored.

If a reduction in the motor speed is recognized in step S3, then in step S4 the motor is switched off, and a sensor signal is analyzed for recognizing a pinching situation. The method can already react to even the least deviations in the motor speed or rpm. Since the motor is switched off immediately, the rpm and the torque of the motor are reduced. On the basis of the sensor signal, the decision is made whether a pinching situation is occurring. This happens within the time period tdec.

In the next step S5, it is decided whether a pinching situation is recognized. If a pinching situation is occurring, then in step S6 the direction of rotation of the motor is changed, and the motor is accelerated with the reversed direction of rotation until it has reached its maximum speed. As soon as a predefined positioned is reached, for instance if the power window system has lowered the window by a predefined distance, the motor is stopped. To that end, as shown in the flow chart in FIG. 3, a return is made to the position "motor off".

If no pinching situation is occurring in step S5, or if it is decided that no pinching situation is occurring, then in step S7 the motor speed is increased again, and the motor continues to operate in the same direction of rotation. In addition, the analyzed sensor signal is stored in memory and filtered out, so that such a sensor signal no longer needs to be taken into account in the next processing step. This is especially advantageous whenever the filtered-out signal is due to shocks on the body from road roughness and bad pavement.

Then, the monitoring of the motor speed is continued in accordance with step S2.

The invention claimed is:

1. A method for pinch protection for a motor-driven closure system, including the following steps:
    recognizing a reduced motor speed;
    switching off the motor in response to recognition of the reduced motor speed;
    upon switching off the motor, analyzing a sensor signal for recognizing a pinching situation;
    deciding whether a pinching situation is present based on the analyzing; and
    controlling the motor as a function of the recognition of whether a pinching situation is present, or not.

2. The method as defined by claim 1, characterized in that a pinching situation is recognized within a predetermined time period (tdec).

3. The method as defined by claim 2, characterized in that the time period (tdec) is shorter than a time period (tstop) within which the motor after the shutoff comes to a standstill.

4. The method as defined by claim 1, characterized in that for recognizing a pinching situation, the rpm of the motor is picked up and evaluated.

5. The method as defined by claim 1, characterized in that for recognizing a pinching situation, the sensor signal of a monitoring sensor is evaluated.

6. The method as defined by claim 1, characterized in that the direction of rotation of the motor is reversed and the motor speed is increased if it is recognized that an object is caught in the closure system.

7. The method as defined by claim 1, characterized in that the motor is switched on again and operated with the same direction of rotation, if it is recognized that no object is caught in the closure system.

8. The method as defined by claim 7, characterized in that the analyzed sensor signal is filtered out.

9. The method as defined by claim 1, characterized in that upon the recognition of the pinching situation, the characteristic curve of the motor shutoff is taken into account.

10. An apparatus for recognizing pinching situations, including a motor, a recognition unit, a control unit, and at least one sensor, wherein the apparatus is arranged for performing the method as defined by claim 1.

11. The apparatus as defined by claim 10, characterized in that the motor is intended as a drive mechanism for a power window, sliding roof or tailgate system in motor vehicles.

\* \* \* \* \*